United States Patent
Plechinger et al.

(10) Patent No.: US 11,849,326 B2
(45) Date of Patent: Dec. 19, 2023

(54) AUTHENTICATION OF A USER OF A SOFTWARE APPLICATION

(71) Applicant: AUDI AG, Ingolstadt (DE)

(72) Inventors: Jörg Plechinger, Munich (DE); Thorsten Hehn, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 321 days.

(21) Appl. No.: 17/293,760

(22) PCT Filed: Oct. 25, 2019

(86) PCT No.: PCT/EP2019/079119
§ 371 (c)(1),
(2) Date: May 13, 2021

(87) PCT Pub. No.: WO2020/099097
PCT Pub. Date: May 22, 2020

(65) Prior Publication Data
US 2022/0014926 A1  Jan. 13, 2022

(30) Foreign Application Priority Data
Nov. 15, 2018 (DE) ...................... 10 2018 219 570.6

(51) Int. Cl.
H04W 12/30 (2021.01)
H04W 12/0431 (2021.01)
(Continued)

(52) U.S. Cl.
CPC ............ H04W 12/35 (2021.01); G06F 21/41 (2013.01); H04W 12/0431 (2021.01); H04W 12/069 (2021.01)

(58) Field of Classification Search
CPC ............... H04L 63/083; H04L 63/0853; H04L 63/0892; H04L 63/105; G06F 21/30; G06F 21/31; G06F 21/34; G06F 21/35
See application file for complete search history.

(56) References Cited

U.S. PATENT DOCUMENTS 9,002,750 B1 * 4/2015 Chu ...................... H04W 12/04
705/72
9,262,474 B2 * 2/2016 Samowicz .......... G06F 16/9535
(Continued)

FOREIGN PATENT DOCUMENTS

DE 102012010559 A1 12/2013
DE 102014013753 A1 3/2016
(Continued)

OTHER PUBLICATIONS

International Preliminary Report on Patentability directed to related International Patent Application No. PCT/EP2019/079119, completed Feb. 25, 2021, with attached English-language translation; 11 pages.

(Continued)

Primary Examiner — Kevin Kim
(74) Attorney, Agent, or Firm — Sterne, Kessler, Goldstein & Fox P.L.L.C.

(57) ABSTRACT

Method and system for authenticating a user comprising: transmitting a network authentication of a user, which is provided by an authentication medium, from a mobile terminal belonging to the user to a back-end server of a wireless network to carry out authentication, connecting the mobile terminal to the wireless network, starting a software application to carry out authentication with respect to an application server accessible via the wireless network, on the mobile terminal by the user, and transmitting an application authentication of the user, which is assigned to the started software application, to the application server.

7 Claims, 1 Drawing Sheet

(51) Int. Cl.
*H04W 12/069* (2021.01)
*G06F 21/41* (2013.01)

(56) References Cited

U.S. PATENT DOCUMENTS

| | | | |
|---|---|---|---|
| 2006/0020791 A1 | 1/2006 | Laitinen | |
| 2007/0005965 A1* | 1/2007 | Nalliah | H04L 63/0823 713/168 |
| 2011/0093442 A1* | 4/2011 | Insepov | G06Q 30/02 709/201 |
| 2011/0197266 A1* | 8/2011 | Chu | H04L 9/3228 726/5 |
| 2012/0084301 A1* | 4/2012 | Sarnowicz | G06F 16/24569 707/769 |
| 2012/0167193 A1* | 6/2012 | Gargaro | G06F 21/41 726/8 |
| 2012/0278241 A1* | 11/2012 | Brown | H04W 12/068 705/67 |
| 2017/0347224 A1* | 11/2017 | Robba | H04L 63/0876 |

FOREIGN PATENT DOCUMENTS

| | | |
|---|---|---|
| WO | WO 2010/128348 A1 | 11/2010 |
| WO | WO 2018/015200 A1 | 1/2018 |

OTHER PUBLICATIONS

International Search Report and Written Opinion of the International Searching Authority directed to related International Patent Application No. PCT/EP2019/079119, dated Feb. 6, 2020, with attached English-language translation; 17 pages.

"3rd Generation Partnership Project; Technical Specification Group Services and System Aspects; Generic Authentication Architecture (GAA); Generic bootstrapping architecture (Release 8)," 3GPP Standard, Nr. V8.0.0, Jun. 1, 2007, pp. 1-77. Available at: http://www.3gpp.org.

"3rd Generation Partnership Project; Technical Specification Group Services and System Aspects; Generic Authentication Architecture (GAA); Access to network application functions using Hypertext Transfer Protocol over Transport Layer Security (HTTPS) (Release 8)," 3GPP TS 33.222, V8.0.0, Jun. 2008, pp. 1-22. Available at: http://www.3gpp.org.

"3rd Generation Partnership Project; Technical Specification Group Services and System Aspects; Liberty Alliance and 3GPP security interworking; Interworking of Liberty Alliance Identity Federation Framework (ID-FF), Identity Web Services Framework (ID-WSF) and Generic Authentication Architecture (GAA) (Release 8)," 3GPP 33.980 V8.0.0, Dec. 2008, pp. 1-38, Available at http://www.3gpp.org.

* cited by examiner

AUTHENTICATION OF A USER OF A SOFTWARE APPLICATION

TECHNICAL FIELD

The present disclosure relates to a method for authenticating a user with the following steps: transmitting a network authentication of a user, which is provided by an authentication medium, from a mobile terminal belonging to the user to a back-end server of a wireless network, to carry out authentication, connecting the mobile terminal to the wireless network, starting a software application to carry out authentication with respect to an application server accessible via the wireless network, on the mobile terminal by the user, and transmitting an application authentication of the user, which is assigned to the software application which has been started, to the application server. The present disclosure also relates to a system for authenticating a user.

BACKGROUND

A person, referred to below as a user, can access resources of the wireless network by means of a mobile terminal connected to a wireless network. The resources of the wireless network usually include a plurality of application servers which are accessible via the wireless network and whose services can be called up in each case by means of a software application running on the mobile terminal. The term "client" is also used for such a software application executed on the mobile terminal. The software application and the application server are then components of a so-called client-server architecture. However, the present disclosure is not limited to client-server architectures at an application level.

The user must be authenticated both when connecting the mobile terminal to the wireless network and when the software application accesses the application server. Authentication methods ensure that a user is authentic, i.e., that he actually has the supposed identity. An authorization procedure also ensures that an authenticated user has the required authorization.

There is an authentication method specifically provided for HTTP application servers which is based on a 3GPP standard and is described, for example, in WO 2010/128348 A1. In this method, a back-end server automatically generates a key pair (credentials) for a user of a mobile terminal, stores it and, if necessary, transmits it to an application server. The application server uses the key pair to authenticate the user.

Authentication methods that are widely used at the application level are based on access data, which are also referred to as credentials. Access data usually include a user name and a password, which are usually freely selectable by the user within specific limits, for example within a predetermined namespace for unique user names and/or above a predetermined minimum security of passwords.

When the mobile terminal is connected to the wireless network, the user of the mobile terminal is first authenticated against a back-end server of the wireless network.

WO 2018/015200 A1 discloses a method for authorizing a V2X (vehicle-to-everything) terminal of a vehicle for connection to a wireless network for V2X communication. In the method, the V2X terminal of the vehicle transmits a proof of authorization, which is provided by a trusted traffic authority for a V2X terminal authorized for V2X communication, to a back-end server of the wireless network.

When the software application accesses the application server via the wireless network, the user is authenticated a second time with respect to the application server.

For convenience, many users use the same application authentication for different software applications or write down different application authentications in an insecure manner, for example by saving them on the mobile terminal. As a result, there is a relatively high risk that application authentication will fall into unauthorized hands and be misused. Therefore, there is a need to secure authentication methods and to simplify handling for the user.

Such a method for authenticating a user is disclosed in DE 10 2014 013 753 A1. In the method, a signature generated by a user's mobile terminal using a user's private key is transmitted to the software application with an identifier provided by a software application to carry out authentication and a reference to a public key corresponding to the private key. The software application decrypts the signature and allows the user to use it if the signature includes the identifier provided.

Another problem with authentication methods becomes apparent when a user uses a plurality of mobile terminals in order to execute a software application, which is configured to carry out authentication with respect to the application server on each mobile terminal. In such a case, the application authentication assigned to the software application has to be transmitted separately to the application server from each mobile terminal on which the software application is executed.

This problem is avoided by the method disclosed by DE 10 2012 0101 559 for authenticating a user. In the method, the application server provides the user with a universal hyperlink in the form of a QR code that is valid for every mobile terminal, which leads to every software application of the user, which is configured to carry out authentication and includes an application authentication of the user assigned to the respective software application. If the user follows the hyperlink, the software application, which is configured to carry out authentication, is started and the application authentication is carried out automatically.

However, the latter two authentication methods are technically relatively complex due to the encryption or the QR code.

The present disclosure is therefore based on the object of specifying a simple and secure method for authenticating a user. In addition, it is an object of the present disclosure to specify a system for authenticating a user.

BRIEF DESCRIPTION OF THE DRAWINGS/FIGURES

DETAILED DESCRIPTION

Figure 1:
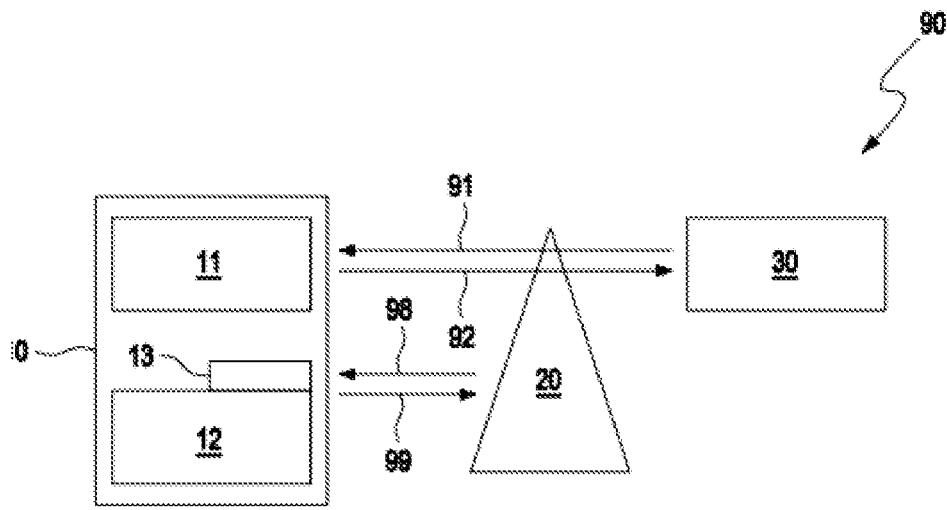
FIG. 1 is a schematic representation of a system and method for authenticating a user according to the prior art.

The present disclosure relates to a method for authenticating a user, including the steps: transmitting a network authentication of a user, which is provided by an authentication medium, from a mobile terminal belonging to the user to a back-end server of a wireless network to carry out authentication, connecting the mobile terminal to the wireless network, starting a software application to carry out authentication with respect to an application server accessible via the wireless network, on the mobile terminal by the user, and transmitting an application authentication of the user, which is assigned to the software application which has been started, to the application server. With a mobile terminal, the user uses a software application via a wireless network, which is provided by an application server.

A mobile terminal can be understood as any device with a communication interface and a software application that can be executed on the mobile terminal, which can be connected to the wireless network via the communication interface and in which the software application must authenticate the user to the application server in order to access the application server, for example a smartphone, a tablet, a notebook, but also a stationary computer or a vehicle, each including a corresponding communication interface.

Non-limiting examples of such software applications are all systems based on a client-server architecture, such as WhatsApp and the like. The wireless network can be an area-wide mobile radio network or a regionally restricted radio network operated by a private operator. The application authentication required to access the application server can include so-called access data, i.e., a user name and a password, which the user usually freely selects while avoiding name conflicts.

The back-end server of the wireless network stores network authentications of all users authorized to connect to the wireless network and allows their access to the wireless network based on the stored network authentications.

It goes without saying that starting a software installation also includes an initial download of a software application from an application server or download server for authentication, such as PlayStore or iStore, and installing the downloaded software installation on the mobile terminal.

In the method according to the present disclosure, an application authentication of the user stored on the back-end server is transmitted from the back-end server of the wireless network to the application server. In other words, the back-end server authenticates the user of the software application to the application server. This relieves the user of having to transmit an application authentication to the application server when he starts the software application for use. On the one hand, this makes it easier to use the software application and reduces the time required to use it. On the other hand, the user does not have to memorize or note down the selected access data, which makes handling a plurality of different access data for different software applications easier. By means of the central storage of the application authentication, the user can connect a plurality of different mobile terminals to the wireless network without additional effort and is always authenticated by the back-end server of the wireless network to the application server, regardless of the mobile device used.

In some aspects the authentication medium is a SIM card of the wireless network inserted into the mobile terminal and assigned to a communication module of the mobile terminal, or a SIM card connected to the mobile terminal and the wireless network hardware security module associated with the communication module of the mobile terminal is used as the authentication medium. SIM cards and hardware security modules (HSM) are widely used devices for authenticating a user to the back-end server of the wireless network and are therefore particularly suitable as authentication medium for the method according to the present disclosure.

In further embodiments, after starting the software application, the application server transmits an authentication request to the started software application and the started software application forwards the authentication request to the back-end server. In other words, the software application does not respond to the authentication request by transmitting the application authentication to the application server. Instead, the software application switches on the back-end server of the wireless network by forwarding the authentication request to it. However, this does not imply that the forwarded authentication request is identical to the authentication request transmitted by the application server. Rather, the former can differ from the latter. However, the forwarded authentication request must include an identifier for the started software application, on the basis of which the back-end server can select the application authentication assigned to the software application.

The back-end server advantageously transmits an authentication request to the started software application and the started software application transmits the network authentication of the user to the back-end server. The back-end server reacts to the forwarded authentication request with an authentication request with which it requests the network authentication of the user from the software application. On the basis of the network authentication, which is transmitted to the back-end server by the software application, the back-end server determines from which mobile terminal and from which user the authentication request of the software application was forwarded to it.

In further embodiments, the started software application queries the network authentication of the user from the authentication medium and the authentication medium supplies the network authentication of the user. In order to be able to transmit the network authentication to the back-end server in response to the authentication request of the back-end server, the software application accesses the communication module of the mobile terminal to which the authentication medium is assigned. In this way, the software application receives the network authentication of the user from the communication module in order to transmit this to the back-end server.

In some aspects, the back-end server manages the application authentication of the user assigned to the started software application in a credential management system and the user authorizes the back-end server once to transmit the application authentication to the application server. The required one-time authorization by the user leaves the user the choice of whether he would like to participate in the method according to the present disclosure. The credential management system is configured to manage a plurality of application authentications and network authentications from a plurality of users for a plurality of software applications.

The started software application cannot be started on a mobile terminal with an authentication medium, for whose network authentication the back-end server does not store any application authentication assigned to the started software application. In other words, if the network authentication assigned to an application authentication for the user cannot be determined by the back-end server, the software application to carry out authentication cannot be started.

In this way, for a mobile terminal used in succession by a plurality of users, for example a vehicle in a car sharing fleet, the software applications that can be used by a user depend on the authentication medium assigned to the mobile terminal. By exchanging the authentication medium, use of a software application can be allowed or excluded.

The present disclosure also relates to a system for authenticating a user, which includes a wireless network, at least one application server to carry out authentication, a back-end server of the wireless network, and at least one mobile terminal having a communication module which can be connected to the wireless network, a software application to carry out authentication with respect to the application server and an authentication medium providing network authentication for a user. The statements made in connection with the method according to the present disclosure apply analogously to the software application, the application server, the wireless network, the back-end server, the mobile terminal.

In the system according to the present disclosure, an application authentication of the user assigned to the at least one software application to carry out authentication, is stored on the back-end server of the wireless network. A substantial aspect is therefore a central storage of the application authentication. Accordingly, instead of the software application, the back-end server can transmit an application authentication required when the software application is started to the application server.

In some aspects, the authentication medium is assigned to the communication module and includes a SIM card of the wireless network inserted into the mobile terminal or a hardware security module of the wireless network connected to the mobile terminal. SIM cards and hardware security modules (HSM) are proven authentication media for mobile terminals, which are used for area-wide mobile radio networks or for regionally restricted private radio networks.

In some embodiments, the back-end server includes a credential management system and the application authentication is stored in the credential management system. The credential management system is configured to manage a plurality of application authentications and network authentications from a plurality of users for a plurality of software applications. The credential management system is therefore a particularly suitable tool for a back-end server of a wireless network.

In further embodiments, the system is configured to carry out a method according to the present disclosure for authenticating the user. The method according to the present disclosure makes it easier for the user to handle a plurality of software applications to carry out authentication using a plurality of mobile terminals.

A substantial advantage of the method according to the present disclosure is that it is easier to use a software application that accesses an application server to carry out authentication, from a plurality of mobile terminals. Another advantage is that a secure and therefore trusted infrastructure of a wireless network is used to carry out the method. It is also advantageous that a mobile terminal can be used by a plurality of users in succession without an authentication conflict.

The present disclosure is illustrated schematically using an embodiment in the drawings and is further described with reference to the drawings.

FIG. 1 is a schematic representation of a diagram of a system and method for authenticating a user according to the prior art. The system includes a wireless network, at least one application server 30 to carry out authentication accessible via the wireless network, a back-end server 20 of the wireless network, and at least one mobile terminal 10 that can be connected to the wireless network.

The mobile terminal 10 includes a software application 11 to carry out authentication with respect to the application server 30, a communication module 12, and an authentication medium 13 providing network authentication of a user. The authentication medium 13 is assigned to the communication module 12 and includes a SIM (subscriber identity module) card of the wireless network inserted into the mobile terminal 10 or a hardware security module (HSM) of the wireless network connected to the mobile terminal 10.

To authenticate the user to the application server 30, the back-end server 20 first transmits 98 an authentication request to the mobile terminal 10. Thereupon, the mobile terminal 10 of the user first transmits 99 a network authentication of the user provided by the authentication medium 13 to the back-end server 20 of the wireless network to carry out authentication. If the transmitted network authentication is valid, the mobile terminal 10 is connected to the wireless network.

In a further step, the user starts a software application 11 to carry out authentication, on the mobile terminal 10, with respect to the application server 30 accessible via the wireless network. After the software application 11 has been started, the application server 30 transmits 91 an authentication request to the started software application 11. The software application 11 thereupon transmits 92 an application authentication of the user assigned to the started software application 11 to the application server 30. The application authentication involves access data, i.e., a user name and a password, which the user is prompted to enter when the software application 11 is started in response to the authentication request from the application server 30.

Figure 2:
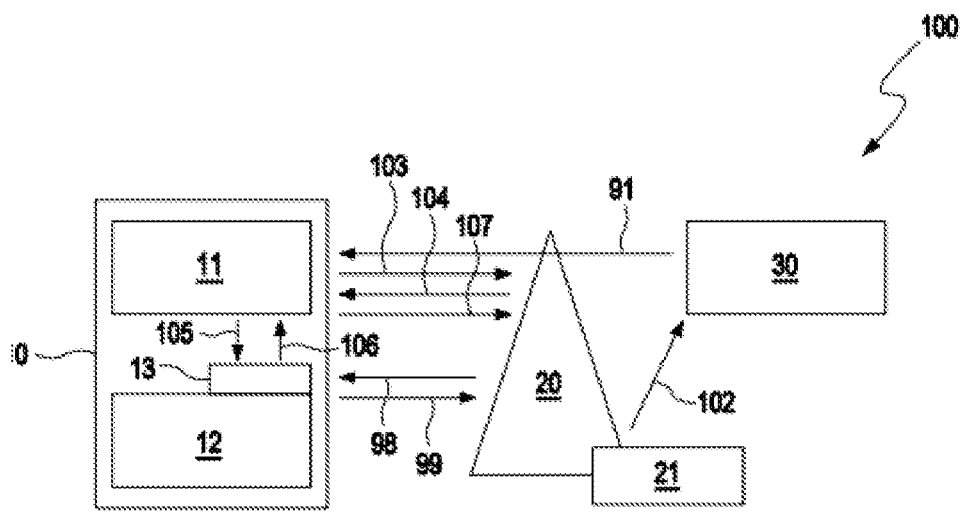
FIG. 2 is a schematic representation of a system and method for authenticating a user according to an embodiment of the present disclosure.

FIG. 2 is a schematic representation of a diagram of a system 1 and method 100 for authenticating a user according to an embodiment of the present disclosure. The system 1 includes a wireless network, at least one application server 30 to carry out authentication and is accessible via the wireless network, a back-end server 20 of the wireless network, and at least one mobile terminal 10 that can be connected to the wireless network.

The mobile terminal 10 includes a software application 11 to carry out authentication with respect to the application server 30, a communication module 12, and an authentication medium 13 providing network authentication of a user. The authentication medium 13 is assigned to the communication module 12 and includes a SIM (subscriber identity module) card of the wireless network inserted into the mobile terminal 10 or a hardware security module (HSM) of the wireless network connected to the mobile terminal 10.

An application authentication of the user assigned to the at least one software application 11 to carry out authentication, is stored on the back-end server of the wireless network. For this purpose, the back-end server 20 includes a credential management system 21, and the application authentication is stored in the credential management system 21.

The system 1 is configured to carry out the method 100 described below for authenticating the user.

First, the back-end server 20 transmits 98 an authentication request to the mobile terminal 10. Thereupon, the mobile terminal 10 of the user transmits 99 a network authentication of the user provided by the authentication medium 13 to the back-end server 20 of the wireless network for authentication. The SIM card of the wireless network inserted into the mobile terminal 10 and assigned to the communication module 12 of the mobile terminal 10 or the hardware security module (HSM) of the wireless network connected to the mobile terminal 10 and assigned to the communication module 12 of the mobile terminal 10 is used as the authentication medium 13. If the transmitted network authentication is valid, the mobile terminal 10 is connected to the wireless network.

The back-end server 20 manages an application authentication of the user assigned to the started software application 11 in a credential management system 21 and is authorized once by the user to transmit 102 the application authentication to the back-end server 20.

The user then starts a software application 11 to carry out authentication on the mobile terminal 10 with respect to the application server 30 accessible via the wireless network. After the software application 11 has been started, the application server 30 transmits 91 an authentication request to the started software application 11. The started software application 11 forwards 103 the authentication request to the back-end server 20.

The back-end server 20 then transmits 104 an authentication request to the started software application 11. The started software application 11 queries 105 the network authentication of the user from the authentication medium 13 and returns 106 the network authentication of the user to the started software application 11. The started software application 11 then transmits 107 the network authentication of the user to the back-end server 20.

Finally, the back-end server 30 transmits 102 the application authentication of the user assigned to the started software application 11 and stored on the back-end server 30 in the credential management system to the application server 30. The application authentication can be access data, i.e., a user name and a password.

LIST OF REFERENCE SIGNS

1 System
10 Terminal
11 Software application
12 Communication module
13 Authentication medium
20 Back-end server
21 Credential management system
30 Application server
90 Authentication method
91 Transmitting an authentication request
92 Transmitting the application authentication
98 Transmitting an authentication request
99 Transmitting the network authentication
100 Method of authentication
101 Transmitting an authentication request
102 Transmitting the application authentication
103 Forwarding the authentication request
104 Transmitting an authentication request
105 Querying the network authentication
106 Providing the network authentication
107 Transmitting the network authentication

The invention claimed is:

1. A method for authenticating a user, comprising:
transmitting a network authentication of the user provided by an authentication medium from a mobile terminal belonging to the user to a back-end server of a wireless network;
connecting the mobile terminal to the wireless network;
starting a software application to carry out the authentication with respect to an application server accessible via the wireless network, on the mobile terminal;
transmitting an authentication request from the application server to the software application after starting the software application and forwarding the authentication request from the software application to the back-end server;
transmitting the authentication request from the back-end server to the software application and transmitting the network authentication of the user from the software application to the back-end server; and
transmitting an application authentication of the user from the back-end server of the wireless network to the application server, wherein the application authentication comprises access data that is selected by the user while avoiding name conflicts, assigned to the software application, and stored on the back-end server.

2. The method of claim 1, wherein the authentication medium comprises a subscriber identity module (SIM) card of the wireless network inserted into the mobile terminal and assigned to a communication module of the mobile terminal, or a hardware security module of the wireless network associated with the communication module of the mobile terminal.

3. The method of claim 1, wherein the software application queries the network authentication of the user from the authentication medium and the authentication medium supplies the network authentication of the user.

4. The method of claim 1, wherein the back-end server manages the application authentication of the user assigned to the software application in a credential management system and is authorized at least one-time by the user to transmit the application authentication to the application server.

5. A system for authenticating a user, comprising:
a wireless network;
at least one application server which conducts authentication and is accessible via the wireless network;
a back-end server of the wireless network;
at least one mobile terminal having a communication module connected to the wireless network, the at least one mobile terminal comprising:
at least one software application to conduct the authentication with respect to the at least one application server, and
an authentication medium providing network authentication for a user; and
an application authentication of the user comprising access data freely selected by the user while avoiding name conflicts, wherein the access data is assigned to the at least one software application, stored on the back-end server and used when authenticating the user.

6. The system of claim 5, wherein the authentication medium is assigned to the communication module and comprises a subscriber identity module (SIM) card of the wireless network inserted into the mobile terminal or a hardware security module of the wireless network connected to the mobile terminal.

7. The system of claim 5, wherein the back-end server comprises a credential management system that stores the application authentication.

* * * * *